(12) United States Patent
Carruthers

(10) Patent No.: US 12,250,124 B2
(45) Date of Patent: Mar. 11, 2025

(54) NETWORK CONFIGURATION MANAGEMENT SYSTEM

(71) Applicant: Bright Star Pty Ltd, New South Wales (AU)

(72) Inventor: Dylan Michael Carruthers, Maraetai (NZ)

(73) Assignee: Bright Star Pty Ltd, New South Wales (AU)

( * ) Notice: Subject to any disclaimer, the term of this patent is extended or adjusted under 35 U.S.C. 154(b) by 173 days.

(21) Appl. No.: 18/134,877

(22) Filed: Apr. 14, 2023

(65) Prior Publication Data

US 2023/0396505 A1    Dec. 7, 2023

(30) Foreign Application Priority Data

Apr. 14, 2022    (AU) .............................. 2022901013

(51) Int. Cl.
| | | |
|---|---|---|
| *H04L 29/06* | (2006.01) | |
| *H04L 41/0816* | (2022.01) | |
| *H04L 41/12* | (2022.01) | |
| *G06F 15/173* | (2006.01) | |

(52) U.S. Cl.
CPC .......... *H04L 41/12* (2013.01); *H04L 41/0816* (2013.01)

(58) Field of Classification Search
CPC ..... H04L 41/12; H04L 41/0816; H04L 29/06; G06F 15/173

USPC ........................................................ 709/238
See application file for complete search history.

(56) References Cited

U.S. PATENT DOCUMENTS

| | | | |
|---|---|---|---|
| 2008/0005298 A1* | 1/2008 | Busalacchi | ............. H04L 41/08 709/223 |
| 2012/0226791 A1 | 9/2012 | Ramaswamy et al. | |
| 2019/0288913 A1* | 9/2019 | Salgueiro | ............. H04L 41/082 |
| 2020/0044940 A1* | 2/2020 | Thomasson | ........... H04L 41/085 |
| 2021/0135934 A1 | 5/2021 | Krishnamurthy et al. | |

* cited by examiner

*Primary Examiner* — Jude Jean Gilles
(74) *Attorney, Agent, or Firm* — Hayes Soloway PC

(57) ABSTRACT

A computer-implemented method discovers a configuration of a network having a plurality of heterogenous devices and a device hierarchy The method includes discovering, using a link layer protocol and a first set of network configuration data including at least a first firmware information, a first device identity information, and a first device configuration information. Discovering the first set of network configuration data includes the sequential steps of: identifying an identity of a home device by a behavior of the home device in response to SSH commands and/or a packet-layer specific behavior of the home device; gathering information about the home device using a set of device-specific link layer protocol commands using a translation library that translates generic commands to the device-specific commands; identifying a neighboring device of the home device by polling active network connections; and; repeating the steps treating the neighboring device as the home device.

18 Claims, 13 Drawing Sheets

```
"hotel paradiso" = {
    "structure_a": {                          351
        "name": "Main building",
        "levels": {                     353
            "basement": {
                "name": "Level-Basement",
                "equipment": {
                    "MELZC-GW01-BM-MCR": {
                        "device_model": "Ruckus ICX7250-24-HPOE",
                        "device_role": "HSIA Switch",
                        "serial": "DUI3229R00A",
                        "rack": "RACK_BM_02",
                        "position": "12",
                        "status": "active",
                        "primary_ip": "10.0.3.253/25",
                    }
                }
            },
            "ground_floor": {
                "name": "Ground Floor",
                "equipment": {
                    "MELZC-SW04-GF-IDF": {
                        "device_model": "Ruckus ICX7150-48-POEF",
                        "device_role": "HSIA Switch",
                        "serial": "FEE3249R016",
                        "rack": "RACK_GF01_02",
                        "position": "2",
                        "status": "active",
                        "primary_ip": "10.0.3.243/25",
                    }
                }
            }
        }
    }
}
```

FIG. 12

| Hardware Type | Hardware Name | Sum of Hardware Quantity |
|---|---|---|
| Access Point | R610 XX dual band 11ac indoor AP 3x3:3 | 9 |
| | R510 XX dual band 11ac indoor AP 2x2:2 | 1 |
| | T350c Wi-Fi 6 Outdoor Access Point 2x2:2 | 40 |
| | Secure Mounting Bracket for R710 | 10 |
| | RUCKUS R350 Indoor Access Point | 150 |
| Edge Switch | 24-PRT POE+ 3 SLOTS-UPLINK/STACK(NO PSU) | 1 |
| | 24-PRT POE+ 4X1G SFP+ | 1 |
| | 24-PRT 4X1G SFP+ | 4 |
| | 48-PRT POE+ 740W 4X1G SFP+ | 3 |
| FibreOptic Patch Lead | FibreOptic Patch Lead - SMOF 1M SC-LC Connector | 20 |
| Firewall | Juniper SRX320 Firewall | 1 |
| Server | Supermicro Rack Mounted Server | 1 |
| SFP Module | 1000BASE-LX; SFP OPTIC, SMF; LC CONN; OP | 16 |
| Switch Module | ICX 7450 4-PRT 1/10G SFP+ MODULE | 2 |
| | Brocade RPS16-E Power Supply for ICX | 2 |
| | BROCADE ICX-FAN10-E ICX | 2 |
| Wireless LAN Controller | SmartZone 144 | 1 |
| Patch Lead - S/UTP | Patch Lead - S/UTP - Cat 6 | 44 |
| | Patch Lead - S/UTP 1m Cat 6 | 204 |
| Patch Panel - S/UTP | Patc Panel - SMOF | 1 |
| Chromecast | Chromecast Gen 3 | 150 |
| Chromecast Security Cable | Chromecast Security Cable | 150 |
| Chromecast Controller | Nonius Cast Controller | 1 |

FIG. 13

```
firmware_upgrade_plan = {
    "meta": {
        "timestamp": 1644013452,
    },
    "instructions": {
        "template": "prod_firmware_upgrade",
        "order": "strict",
        "priority": "critical",
        "scheduled_start": 1644015000,
        "max_slices": 3,
        "parameters": {
            "targets": "rnet-syd-au",
            "group_name": "hsia-server",
            "target_firmwares": {
                "ruckus": {
                    "7150": ["SPS08095caufi.bin", "SPR08095caufi.sig"],
                }
            },
        },
    },
    "steps": [
        ["10.0.3.250", "10.0.3.252"],
        ["10.0.3.251"],
        ["10.0.3.253"],
    ],
}
```

```
name: Dubai Hotels Incorporated
banners:
  switches:
firmware_versions:
  ruckus:
    icx-1234:                  ⟵ 369
      acceptable:
      - 81c
      - 95b
https:                                      390/400
  allowed_ssl:                              ⟵
  - TLSv1.2
  - TLSv1.3
ssh:
  allowed_ciphers:
  - aes128-ctr
  - aes256-ctr
  - arcfour256               ⟵ 371
  - arcfour
  - aes128-cbc
  - aes256-cbc
  default_port: 22
security:
  8021x: true
vlans:
  admin_wireless:
    '2000':
      dhcp:
        first_ip: 10.20.0.10
        gateway: 10.20.0.254
        last_ip: 10.20.0.253      ⟵ 373
        network: 10.20.0.0/24
  guest_wired:
    '900':
      dhcp:
        first_ip: 10.9.0.10
        gateway: 10.9.0.254
        last_ip: 10.9.0.253
        network: 10.9.0.0/24
  guest_wireless:
    '1000':
      dhcp:
        first_ip: 10.10.0.10
        gateway: 10.10.0.254
        last_ip: 10.10.0.253
        network: 10.10.0.0/24
    '1001':
      dhcp:
        first_ip: 10.10.1.10
        gateway: 10.10.1.254
        last_ip: 10.10.1.253
        network: 10.10.1.0/24
    '1002':
      dhcp:
        first_ip: 10.10.2.10
        gateway: 10.10.2.254
        last_ip: 10.10.2.253
        network: 10.10.2.0/24
wireless_networks:
  admin:
    security:
      client_isolation: false
  guest:
    security:
      client_isolation: true
  vendor:
    security:
      client_isolation: true
```

FIG. 16

NETWORK CONFIGURATION MANAGEMENT SYSTEM

CROSS-REFERENCE TO RELATED APPLICATIONS AND PRIORITY

This patent application claims priority from Australian Patent Application No. 2022901013 filed Apr. 14, 2022. This patent application is herein incorporated by reference in its entirety.

TECHNICAL FIELD

This invention relates to a network configuration management system.

BACKGROUND

Networks are incredibly complex physical and digital architectures. In virtually any building of sufficient size, such as hospitals, shopping malls, hotels, or large office buildings, the network complexity and frequency of changes to the network mandate the near full-time attention of expensive professionals to ensure that the network remains sufficiently operational. Networks may include a large number of devices with a vast variety of identities, manufacturing years, origins of manufacture, and capabilities.

Additional complexity is introduced by the application of networking standards by the owners, or franchise owners, of such buildings, as well as the application of networking standards recommended or imposed by original equipment manufacturers, as well as the network operations center (NOC) that is administering the network. As a result, the simple tasks of adding devices to the network, removing devices from the network, firmware upgrades, or physical movement of devices within the network, can become cumbersome manual labour, without which the network would quickly become non-operational, or non-compliant with relevant standards.

It would be desirable to be able to manage a network configuration change centrally and automatically, taking into account the specifics of the network being updated, the relevant standards being applied, as well as the physical characteristics of the network.

SUMMARY

It is an object of the present invention to at least substantially address one or more of the above disadvantages, or at least provide a useful alternative to the above methods of changing a configuration of a network.

The present disclosure provides a computer-implemented method for discovering a configuration of a network, the network having a plurality of heterogenous devices and a device hierarchy, the method including the steps of:
  discovering, using a link layer protocol and a set, a first set of network configuration data including at least, in relation to the respective device, a first firmware information, a first device identity information, and a first device configuration information,
  wherein the step of discovering the first set of network configuration data includes the sequential steps of:
    (a) identifying an identity of a home device by a behavior of the home device in response to SSH commands and/or a packet-layer specific behavior of the home device;
    (b) gathering information about the home device using a set of device-specific link layer protocol commands using a translation library that translates generic commands to the device-specific commands;
    (c) identifying a neighboring device of the home device by polling active network connections; and;
    (d) repeating steps (a)-(c) treating the neighboring device as the home device.

Preferably, the method further includes the steps of:
  creating, using the first set of network configuration data, a network configuration source of truth, the source of truth containing, in relation to each device, a firmware truth, a device identity truth, a device configuration truth, and a device hierarchy truth;
  receiving a second network configuration standard;
  creating a network configuration change request by comparing the source of truth to the second network configuration standard, such that, after application of the network configuration change request, the source of truth is compliant with the second network configuration standard.

Preferably, the method further includes, when used for changing a configuration of a network, the steps of:
  creating, using the first set of network configuration data, a network configuration source of truth, the source of truth containing, in relation to each device, a firmware truth, a device identity truth, a device configuration truth, and a device hierarchy truth;
  receiving a network configuration change request relating to one or more devices in the network;
  determining a device configuration plan based on the network configuration change request, the device configuration truth, and the device identity truth, the device configuration plan including an updated device configuration information for each device affected by the network configuration change request;
  determining an orchestration plan based on the network configuration change request, the device identity truth, and the device hierarchy truth, the orchestration plan including an order of devices affected by the network configuration change request; and
  applying the updated device configuration information to each device affected by the network configuration change request in the order of the orchestration plan.

Preferably, the method further includes the step of:
  receiving a second set of network configuration data, the second set of network configuration data including, in relation to the respective device, one or more of a physical location information, a physical connectivity information, a second firmware information, and a second device identity information,
  wherein the step of creating the network configuration source of truth includes comparing the first set of network configuration data to the second set of network configuration data and excluding conflicting data from the source of truth, and adding a physical location truth and a physical connectivity truth to the source of truth, based on the second set of network configuration data.

Preferably, the method further includes the step of:
  creating, using the first set of network configuration data, a site survey plan for obtaining the second set of network configuration data, the site survey plan including device identity information and physical location information that is derivable from the first set of network configuration data.

Preferably, the method further includes the steps of:
receiving a network update definition, the network update definition including a new device identity information and a new identity device configuration information of devices to be added to the network, as well as a device removal information of devices to be removed from the network;
determining a bill of materials containing devices to be installed to fulfill the network update definition, based on the network update definition and the source of truth;
creating a network change request by comparing the network update definition to the source of truth.

Preferably, the method further includes the steps of:
receiving a confirmation that the devices to be installed to fulfill the network update definition have been installed;
discovering, using a link layer protocol, a third set of network configuration data including at least, in relation to the respective device, a third firmware information, a third device identity information, and a third device configuration information;
comparing the third set of network configuration data to the source of truth to:
 update the source of truth with the third set of network configuration data, if the third set of network configuration data is consistent with the network update definition; and
 remove conflicts from the source of truth.

Preferably, the method further includes the steps of:
determining a device firmware plan based on the network configuration change request, the device firmware truth, and the device identity truth, the device firmware plan including updated firmware information for one or more devices affected by the network change request; and
applying the updated firmware information to the one or more devices affected by the network change request in the order of the orchestration plan.

Preferably, the method further includes the step of:
providing the device firmware plan and the orchestration plan to an operator for approval.

Preferably, the method further includes the step of:
updating the source of truth based on the network configuration change request.

Preferably, the method further includes the steps of:
receiving a second network configuration standard;
creating a network configuration change request by comparing the source of truth to the second network configuration standard such that, after application of the network configuration change request, the source of truth is compliant with the second network configuration standard.

Preferably, the method further includes the steps of:
receiving a NOC network configuration standard;
before applying the network configuration change request, modifying the network configuration change request by comparing the network configuration change request to the NOC network configuration standard, such that, after application of the network configuration change request, the source of truth is compliant with the NOC network configuration standard.

Preferably, the method further includes the steps of:
receiving a NOC network configuration standard;
creating a network configuration change request by comparing the source of truth to the NOC network configuration standard such that, after application of the network configuration change request the source of truth is compliant with the NOC network configuration standard.

Preferably, the method further includes the step of:
after a time interval, discovering, using a link layer protocol, a third set of network configuration data including at least, in relation to the respective device, a third firmware information, a third device identity information, and a third device configuration information;
comparing the third set of network configuration data to the source of truth and removing conflicts from the source of truth.

Preferably, the method further includes the step of:
providing the device configuration plan and the orchestration plan to an operator for approval.

The present disclosure also provides a non-transient computer-readable medium containing executable instructions for configuring a processor of a processing system to change a configuration of a network,
 wherein execution of the executable instructions by the processor configures the processor to perform the steps of the method of the disclosed method.

The present disclosure also provides one or more servers performing the disclosed method.

The present disclosure also provides a system for managing the configuration of a network, the system including:
 an electronic device; and
 the one or more disclosed servers.

BRIEF DESCRIPTION OF THE DRAWINGS

Preferred embodiments of the present invention will now be described by way of example, with reference to the accompanying drawings, wherein:

FIG. 12 is an example of a site survey plan.

FIG. 13 is an example of a bill of materials.

FIG. 14 is an example of a device firmware plan or a device configuration plan.

FIG. 15 is an example of an orchestration plan.

FIG. 16 is an example of a NOC network configuration standard or a second network configuration standard.

DETAILED DESCRIPTION OF THE DRAWINGS

Figure 1A:
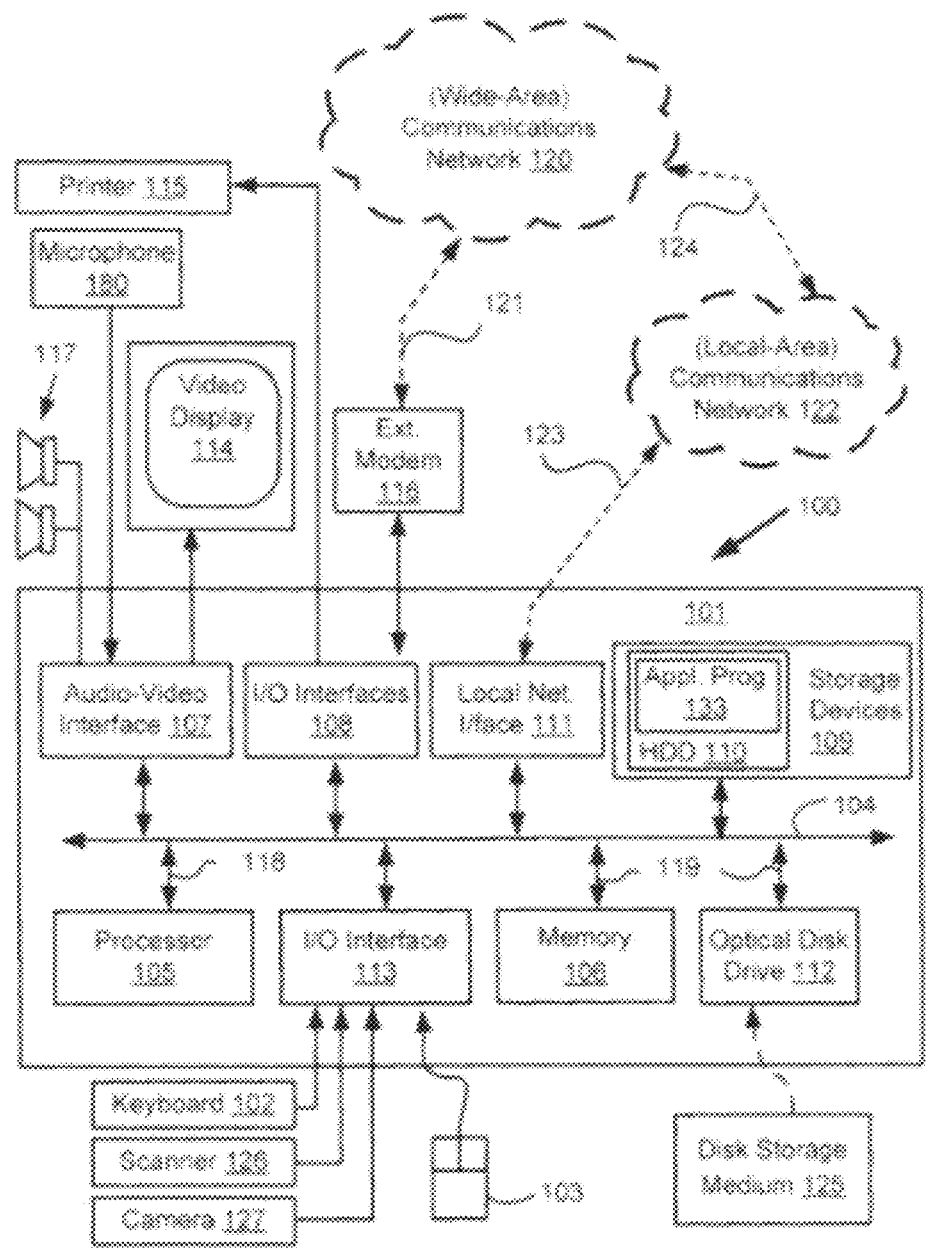
FIGS. 1A and 1B show a general-purpose computer system 100, upon which a preferred embodiment of the method according to the present invention is implemented.
Figure 1B:
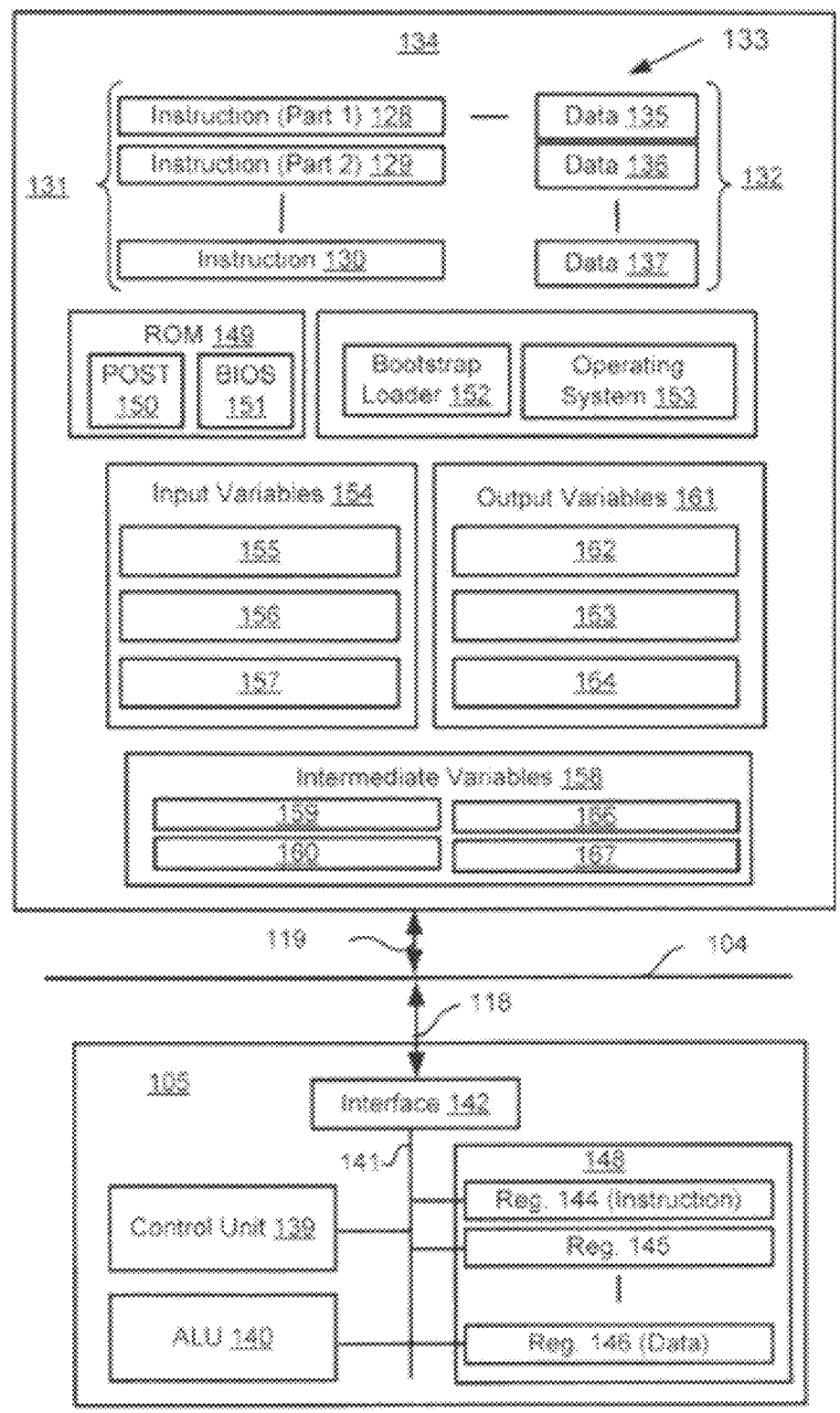

FIGS. 1A and 1B depict a general-purpose computer system 100, upon which the various arrangements described can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an 1/0 interface 113 that couples to the keyboard 102, mouse 103, scanner 126, camera 127 and optionally a joystick or other human interface device (not illustrated), or a projector; and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The 1/0 interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 105 to 113 of the computer module 101 typically communicate via an interconnected bus I 04 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer system.

The methods as described herein may be implemented using the computer system 100 wherein the processes of FIGS. 3 to 15, to be described, may be implemented as one or more software application programs 133 executable within the computer system 100. In particular, the steps of the methods described herein are effected by instructions 131 (see FIG. 1B) in the software 133 that are carried out within the computer system 100. The software instructions 131 may be formed as one or more code modules, each for performing one or more particular tasks.

The software may be stored in a non-transient computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for detecting and/or sharing writing actions.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects the computer-implemented method for extracting content from a physical writing surface.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCM CIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high-level functions, including processor management, memory management, device management, storage management, software application interface, and generic user interface. It is now common for multiple independent operating systems to be hosted on the same processor 105 using so-called virtualization applications.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor I 05 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts, each of which is stored in a separate memory location, as depicted by the instruction segments shown in the memory locations 128 and 129.

In general, the processor 105 is given a set of instructions which are executed therein. The processor I 05 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from the storage medium 125 inserted into the corresponding reader 112, all depicted in FIG. 1A The execution of a set of the instructions may in some cases result in output of data. Execution may also involve storing data or variables to the memory 134.

The disclosed writing detection and sharing arrangements use input variables 154, which are stored in the memory 134 in corresponding memory locations 155, 156, 157. The writing detection and sharing arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of microoperations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;
   a decode operation in which the control unit 139 determines which instruction has been fetched; and
   an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 162.

Each step or sub-process in the processes of FIGS. 3 to 15 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The methods described herein may alternatively be implemented in dedicated hardware such as one or more integrated circuits performing the functions or sub functions of the writing detection and sharing methods. Such dedicated hardware may include graphic processors, digital signal processors, or one or more microprocessors and associated memories.

Figure 2A:
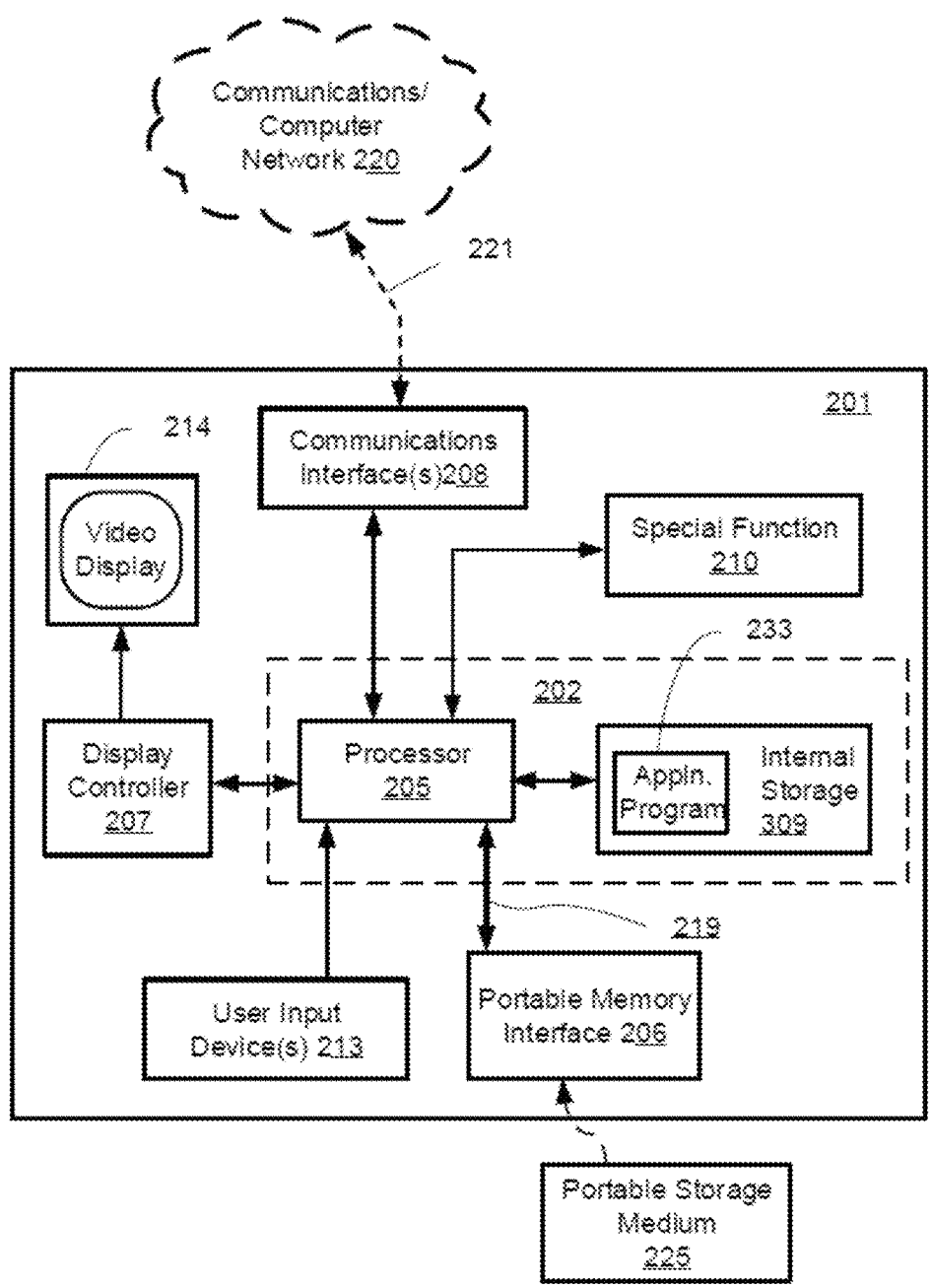
FIGS. 2A and 2B show an embedded device 201, upon which at least some portions of the preferred embodiment of the method according to the present invention is implemented.
Figure 2B:
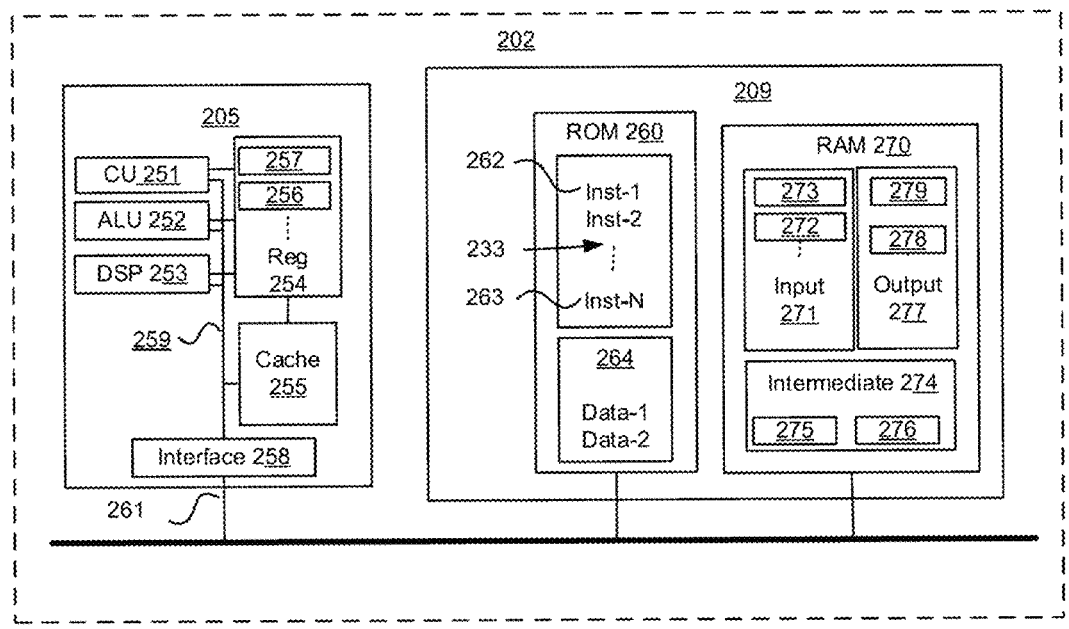

FIGS. 2A and 2B collectively form a schematic block diagram of a general-purpose electronic device 201 including embedded components, upon which the writing detection and/or sharing methods to be described are desirably practiced. The electronic device 201 may be, for example, a mobile phone, a portable media player, virtual reality glasses, augmented reality glasses, or a digital camera, in which processing resources may be limited. Nevertheless, the methods to be described may also be performed on higher-level devices such as desktop computers, server computers, and other such devices with significantly larger processing resources.

As seen in FIG. 2A, the electronic device 201 comprises an embedded controller 202. Accordingly, the electronic device 201 may be referred to as an "embedded device." In the present example, the controller 202 has a processing unit (or processor) 205 which is bidirectionally coupled to an internal storage module 209. The storage module 209 may be formed from non-volatile semiconductor read only memory (ROM) 260 and semiconductor random access memory (RAM) 270, as seen in FIG. 2B. The RAM 270 may be volatile, non-volatile or a combination of volatile and non-volatile memory.

The electronic device 201 includes a display controller 207, which is connected to a display 214, such as a liquid crystal display (LCD) panel or the like. The display controller 207 is configured for displaying graphical images on the display 214 in accordance with instructions received from the embedded controller 202, to which the display controller 207 is connected.

The electronic device 201 also includes user input devices 213 which are typically formed by keys, a keypad or like controls. In some implementations, the user input devices 213 may include a touch sensitive panel physically associated with the display 214 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 2A, the electronic device 201 also comprises a portable memory interface 206, which is coupled to the processor 205 via a connection 219. The portable memory interface 206 allows a complementary portable memory device 225 to be coupled to the electronic device 201 to act as a source or destination of data or to supplement the internal storage module 209. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 201 also has a communications interface 208 to permit coupling of the device 201 to a computer or communications network 220 via a connection 221. The connection 221 may be wired or wireless. For example, the connection 221 may be radio frequency or optical. An example of a wired connection includes Ethernet. Further, an example of wireless connection includes Bluetooth TM type local interconnection, Wi-Fi (including protocols based on the standards of the IEEE 802.11 family), Infrared Data Association (IrDa) and the like.

Typically, the electronic device 201 is configured to perform some special function. The embedded controller 202, possibly in conjunction with further special function components 210, is provided to perform that special function. For example, where the device 201 is a digital camera, the components 210 may represent a lens, focus control and image sensor of the camera. The special function component 210 is connected to the embedded controller 202. As another example, the device 201 may be a mobile telephone handset. In this instance, the components 210 may represent those components required for communications in a cellular telephone environment. Where the device 201 is a portable device, the special function components 210 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 202, where the processes of FIGS. 3 to 12 may be implemented as one or more software application programs 233 executable within the embedded controller 202. The electronic device 201 of FIG. 2A implements the described methods. In particular, with reference to FIG. 2B, the steps of the described methods are effected by instructions in the software 233 that are carried out within the controller 202. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 233 of the embedded controller 202 is typically stored in the non-volatile ROM 260 of the internal storage module 209. The software 233 stored in the ROM 260 can be updated when required from a computer readable medium. The software 233 can be loaded into and executed by the processor 205. In some instances, the processor 205 may execute software instructions that are located in RAM 270. Software instructions may be loaded into the RAM 270 by the processor 205 initiating a copy of one or more code modules from ROM 260 into RAM 270. Alternatively, the software instructions of one or more code modules may be preinstalled in a non-volatile region of RAM 270 by a manufacturer. After one or more code modules have been located in RAM 270, the processor 205 may execute software instructions of the one or more code modules.

The application program 233 is typically pre-installed and stored in the ROM 260 by a manufacturer, prior to distribution of the electronic device 201. However, in some instances, the application programs 233 may be supplied to the user encoded on one or more CD-ROM (not shown) and read via the portable memory interface 206 of FIG. 2A prior to storage in the internal storage module 209 or in the portable memory 225. In another alternative, the software application program 233 may be read by the processor 205 from the network 220, or loaded into the controller 202 or the portable storage medium 225 from other computer readable media. Computer readable storage media refers to any non-transitory tangible storage medium that participates in providing instructions and/or data to the controller 202 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 201. Examples of transitory or non-tangible computer readable transmission media that may also participate in the provision of software, application programs, instructions and/or data to the device 201 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 233 and the corresponding code modules mentioned above may be executed to implement one or more graphical user interfaces (GUis) to be rendered or otherwise represented upon the display 214 of FIG. 2A. Through manipulation of the user input device 213 (e.g., the keypad), a user of the device 201 and the application programs 233 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 2B illustrates in detail the embedded controller 202 having the processor 205 for executing the application programs 233 and the internal storage 209. The internal storage 209 comprises read only memory (ROM) 260 and random access memory (RAM) 270. The processor 205 is able to execute the application programs 233 stored in one or both of the connected memories 260 and 270. When the electronic device 201 is initially powered up, a system program resident in the ROM 260 is executed. The application program 233 permanently stored in the ROM 260 is sometimes referred to as "firmware". Execution of the firmware by the processor 205 may fulfil various functions, including processor management, memory management, device management, storage management and user interface.

The processor 205 typically includes a number of functional modules including a control unit (CU) 251, an arithmetic logic unit (ALU) 252, a digital signal processor (DSP) 253 and a local or internal memory comprising a set of registers 254 which typically contain atomic data elements 256, 257, along with internal buffer or cache memory 255. One or more internal buses 259 interconnect these functional modules. The processor 205 typically also has one or more interfaces 258 for communicating with external devices via system bus 281, using a connection 261. In some embodiments, the processor 205 may be a collection of FPGA processors, known as a "graphics card", in which case the connection 261 is commonly a PCI-Express bus.

The application program 233 includes a sequence of instructions 262 though 263 that may include conditional branch and loop instructions. The program 233 may also include data, which is used in execution of the program 233. This data may be stored as part of the instruction or in a separate location 264 within the ROM 260 or RAM 270.

In general, the processor 205 is given a set of instructions, which are executed therein. This set of instructions may be organised into blocks, which perform specific tasks or handle specific events that occur in the electronic device 201. Typically, the application program 233 waits for events and subsequently executes the block of code associated with that event. Events may be triggered in response to input from a user, via the user input devices 213 of FIG. 2A, as detected by the processor 205. Events may also be triggered in response to other sensors and interfaces in the electronic device 201.

The execution of a set of the instructions may require numeric or non-numeric variables to be read and modified. Such numeric variables are stored in the RAM 270. The disclosed method uses input variables 271 that are stored in known locations 272, 273 in the memory 270. The input variables 271 are processed to produce output variables 277 that are stored in known locations 278, 279 in the memory 270. Intermediate variables 274 may be stored in additional memory locations in locations 275, 276 of the memory 270. Alternatively, some intermediate variables may only exist in the registers 254 of the processor 205.

The execution of a sequence of instructions is achieved in the processor 205 by repeated application of a fetch-execute cycle. The control unit 251 of the processor 205 maintains a register called the program counter, which contains the address in ROM 260 or RAM 270 of the next instruction to be executed. At the start of the fetch execute cycle, the contents of the memory address indexed by the program counter is loaded into the control unit 251. The instruction thus loaded controls the subsequent operation of the processor 205, causing for example, data to be loaded from ROM memory 260 into processor registers 254, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 233, and is performed by repeated execution of a fetch-execute cycle in the processor 205 or similar programmatic operation of other independent processor blocks in the electronic device 201.

Figure 3:
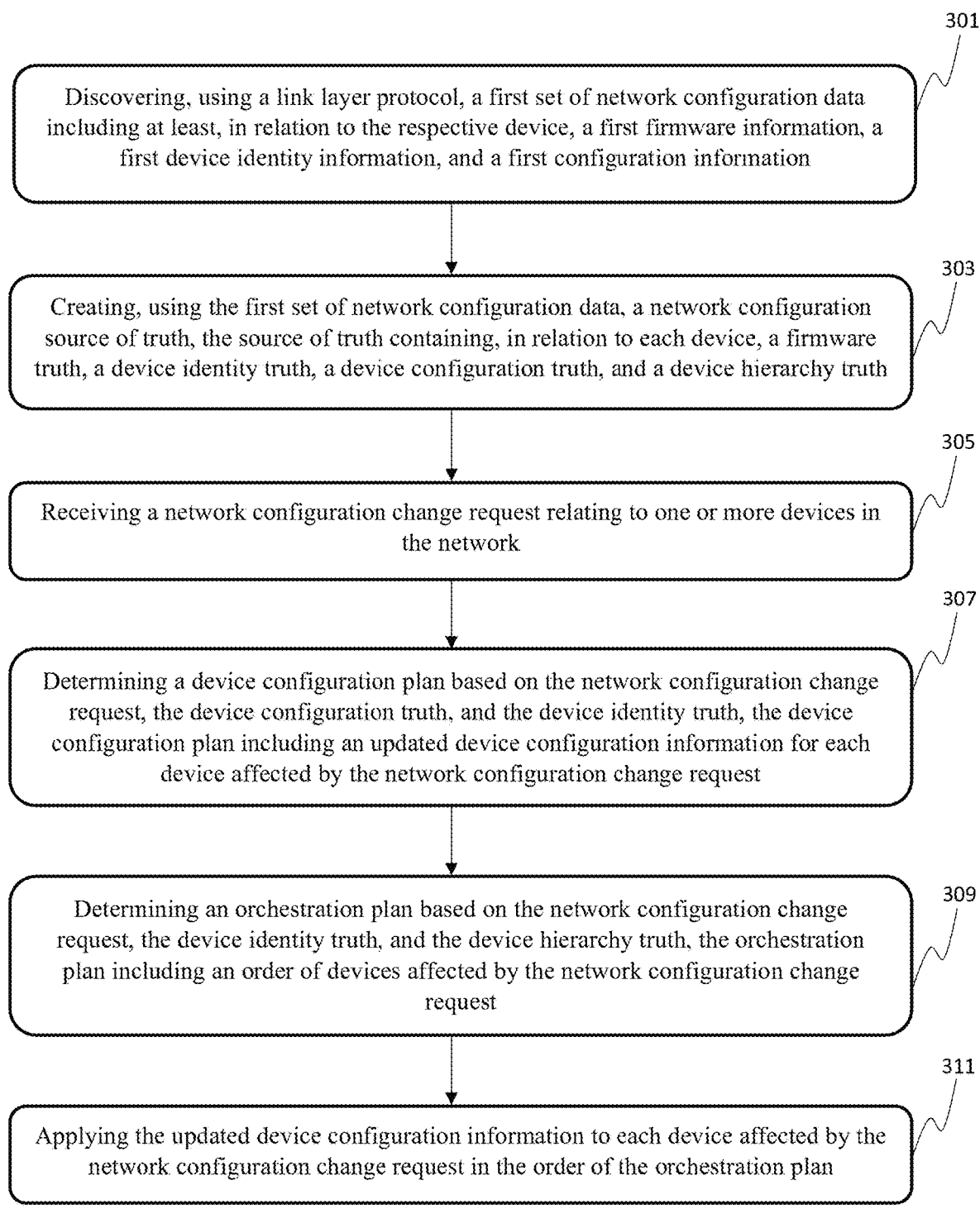
FIG. 3 is a flowchart showing a method for configuration of a network according to a preferred embodiment of the invention.
Figure 4:
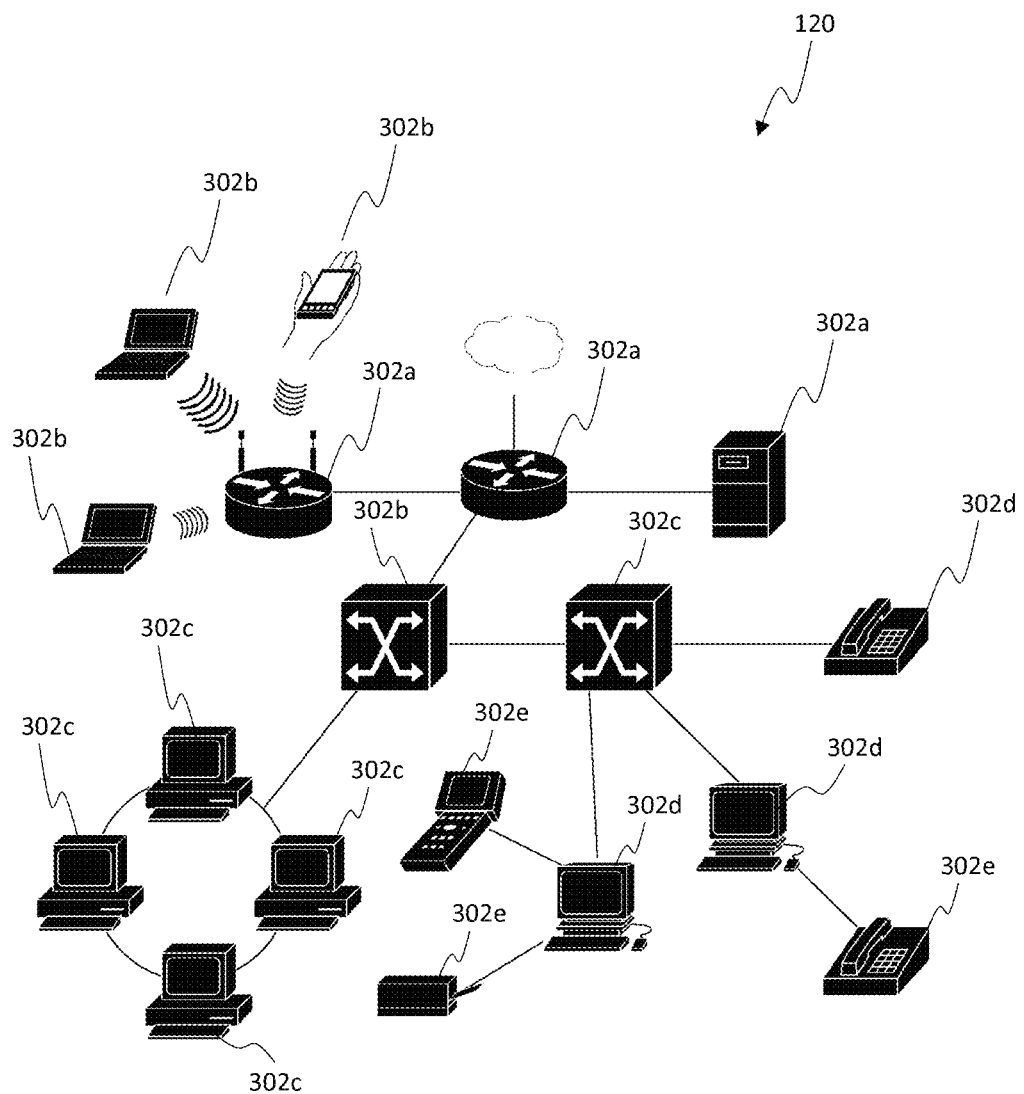
FIG. 4 is an example of a network that may be configured using the method of FIG. 3.

FIG. 3 shows a flowchart of a computer-implemented method for changing a configuration of a network 120 according to a preferred embodiment of the invention. As shown in FIG. 4, the network 120 contains a plurality of devices 302a, 302b, 302c, 302d, 302e, collectively device 302. The devices 302 are typically heterogenous, meaning that the function of each device 302 may be different, for example one device 302 may be a router, while another is a switch, a personal computer, a server, or other devices 302 that may be connected to the network 120. Further, each device 302 is connected to the network 120 in a hierarchy, as also shown in FIG. 4. For example, a group of devices 302c may be connected to a switch 302b, thus the switch 302b is in a higher hierarchy level than the group of devices 302c. Similarly, a group of switches 302b may be connected to a higher level switch 302a, thus the switch 302a is in a yet higher hierarchy level than the group of switches 302b.

The method of FIG. 3 commences, at step 301, by discovering, using a link layer protocol, such as LLDP, a first set of network configuration data. In one embodiment, step 301 includes being provided with a home device whose access credentials are known. Then obtaining information about the identity of the home device by accessing the home device using SSH. Libraries such as Napalm are able to identify the home device by the behaviour of the home device in response to certain SSH commands, as well as packet-layer specific behaviour of the home device. Once the home device has been identified, generic commands may be translated to device-specific LLDP commands using the Napalm library to gather more specific information about the home device. Once all relevant or desired information about the home device has been obtained, the neighbours of the home device are identified by polling active network connections and the process is repeated for each neighbouring device, until all devices on the network are identified.

The first set of network configuration data includes information in relation to each discovered device 302, for example, the first set of network configuration data may include a first firmware information relating to the firmware version and/or date of the device 302. The first set of network configuration data may also include a first device identity information, relating to one or more of a manufacturer, a model number, a MAC address, or a IMEI number of the device 302. The first set of network configuration data may further include a first device configuration information relating to one or more of a port configuration, a firewall configuration, a listing of connected devices, or any other type of configurable settings that may apply to the device 302.

The method then proceeds, at step 303, by creating, using the first set of network configuration data, a network configuration source of truth 310. The source of truth 310 includes a firmware truth, based on the first firmware information, a device identity truth, based on the first device identity information, a device configuration truth, based on the first device configuration information, and a device hierarchy truth that is determined based on the first device configuration information.

Figure 5:
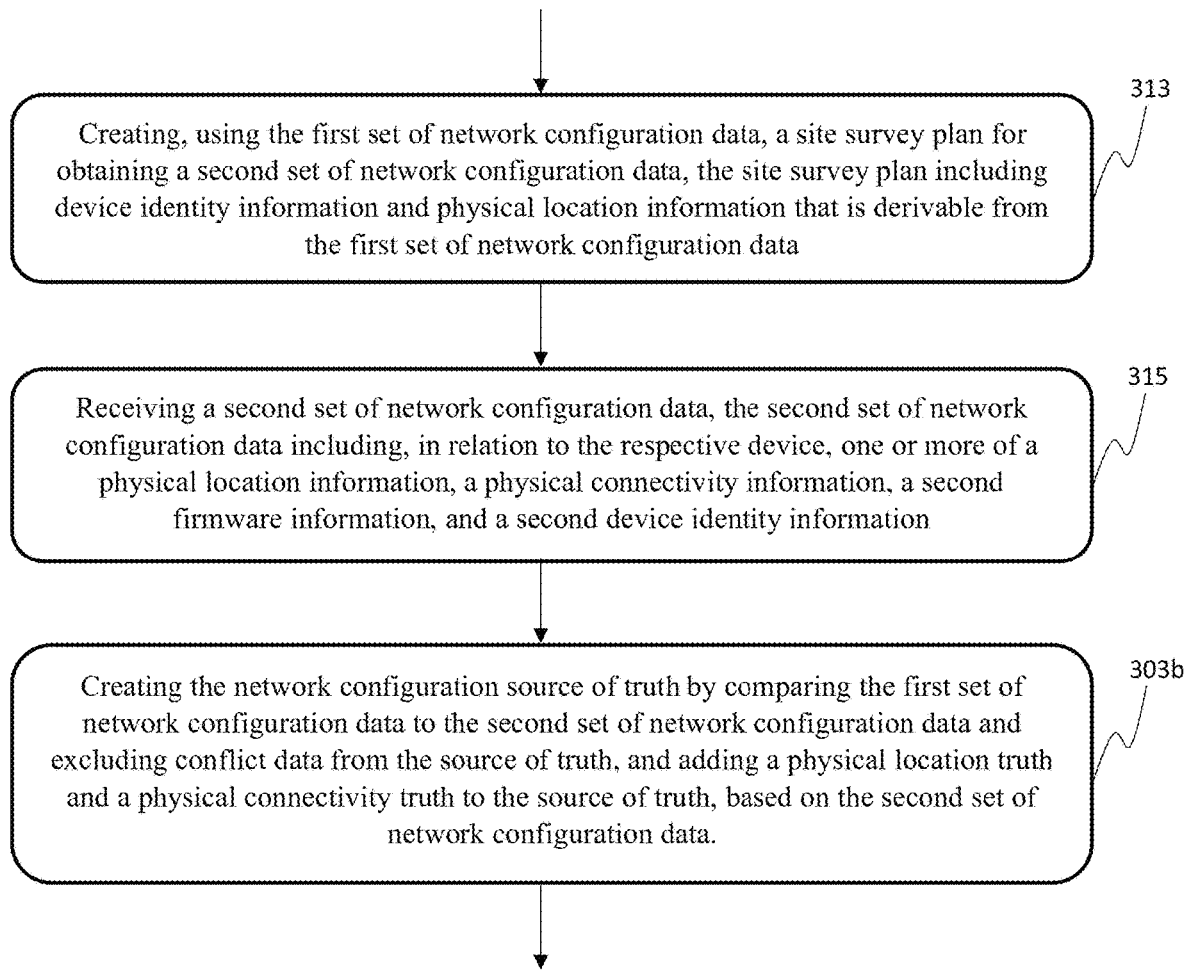
FIG. 5 is a further flowchart of the method of FIG. 3, showing receipt of physical location information.

In a preferred embodiment, as shown in FIG. 5, the method also includes, at step 315, receiving a second set of network configuration data. Preferably, the second set of network configuration data was obtained by conducting a physical site survey of the network 120, that is, physically inspecting the identity and location of each device 302 connected to the network 120. The second set of network configuration data preferably includes, in relation to each device 302, a physical location information related to a physical location of the device. The second set of network configuration data may also include a physical connectivity information relating to one or more of a port configuration of the device 302, an access restriction or capability of the device 302, such as capacity of cable trays and conduits. The second set of network configuration data may also include a second firmware information and a second device identity information that a similar in nature to the first firmware information and the first device identity information, but gathered from the physical site survey of the network 120.

In the preferred embodiment shown in FIG. 5, the source of truth 310 is created in step 303b based on a combination of the first and second sets of network configuration data by comparing the first set of network configuration data to the second set of network configuration data, while flagging and excluding conflicting information between these data sets. The physical location information and physical connectivity information are added to the source of truth 310 as a physical location truth and a physical connectivity truth.

To assist the physical site survey used to produce the second set of network configuration data, the method may include step 313 of creating, based on the first set of network configuration data, a site survey plan 320 for obtaining the second set of network configuration data. As shown in FIG. 12, the site survey plan 320 preferably includes hierarchical physical location information 351, for example information relating to a building, level in the building, room on the level, and location in the room of devices 302. The site survey plan 320 may also include device identity information 353 and physical location and/or connectivity information that is derivable from the first set of network configuration data, such as identity and number of ports, or identification numbers of the equipment, to be verified by the physical site survey. The physical location information may, for example, be derived from an estimate of the signal quality from known locations of devices 302 in the network 120, as well as time of flight calculations of data transfer between the devices 302.

Now that the source of truth 310 has been created, it is possible to use the various truths in the source of truth 310 to plan and orchestrate changes to the configuration of the network 120. As seen in FIG. 3, the method processes such changes in configuration by, at step 305, receiving a network configuration change request that may relate to one or more devices 302 in the network 120. The network configuration change request may include details as to how the configuration of the network 120 is to be altered, in terms of configuration, firmware, connection, and/or presence of each device 302. The method proceeds, at step 307, by determining a device configuration plan 360 based on the network configuration change request, the device configuration truth, and the device identity truth.

The device configuration plan 360, as shown in FIG. 14, includes an updated device configuration information for each device 302 affected by the network configuration change request 350. The updated device configuration information is determined for each device 302 based on the device identity truth, since each device 302 may require different configuration information to have the desired effect, due to the heterogenous nature of the devices 302. To assist this project, the source of truth 310 includes a configuration library that allows translation of a generic configuration instruction, contained in the network configuration change request, to a specific configuration instruction adapted to effect the intent of the generic configuration instruction in the specific device 302. For example a set of generic instructions as shown below, may be translated to the device specific instructions shown thereafter. The configuration library is a collation of manufacturer-provided user instructions as to how each device 302 may be configured, that is linked to a generic instruction language for the type of network configurations typically performed by the method.

Generic Instructions:

```
intent = {
  "meta": {
    "timestamp": 1644013452,
    "version": "1.0",
  },
  "changes": {
    "10.0.3.253": {
      "vlans": {
        "create": {
          "102": "Room 102"
        },
        "assign": {
          "tagged": "1/1/12"
        },
        "remove": {
          "tagged": "1/1/11"
        }
      }
    }
  }
}
```

Device-specific instruction set:

```
conf t
vlan 102
description "Room 102"
tagged ethernet 1/1/12
no tagged ethernet 1/1/11
end
wr me
logout
```

As shown in FIG. 3, the method continues, with step 309, by determining an orchestration plan 370 based on the network configuration change request, the device identity truth, and the device hierarchy truth. As shown in FIG. 15, the orchestration plan 370 includes an order of devices 302 affected by the network configuration change request 350. Configuration changes to networks 120 should be carried out in a specific order to avoid a configuration change to a node device, for example a switch, leading to a loss of communication with devices connected to the switch as a result of the configuration change to the switch. To avoid these situations, the orchestration plan 370 specifies the order 372 in which the device configuration plan 360 should be applied. The orchestration plan 370 is determined based on the hierarchy truth, as well as a hierarchy library, such as a look-up table, that allows, using the generic configuration instructions, the identification of changes to device configuration truths that can be conducted in parallel, and the identification of changes to device configuration truths that must be conducted sequentially, either top-down, or bottom-up. In the example shown in FIG. 15, devices 302 in the arm 365 must be configured before device 302 at position 367 may be configured. The steps of the orchestration plan 370 are recited in the device configuration plan 360, as shown in FIG. 14.

Finally, at step 311, the method applies the updated device configuration information to each device 302 affected by the network configuration change request 350 in the order 372 of the orchestration plan 370.

Figures 6, 7:
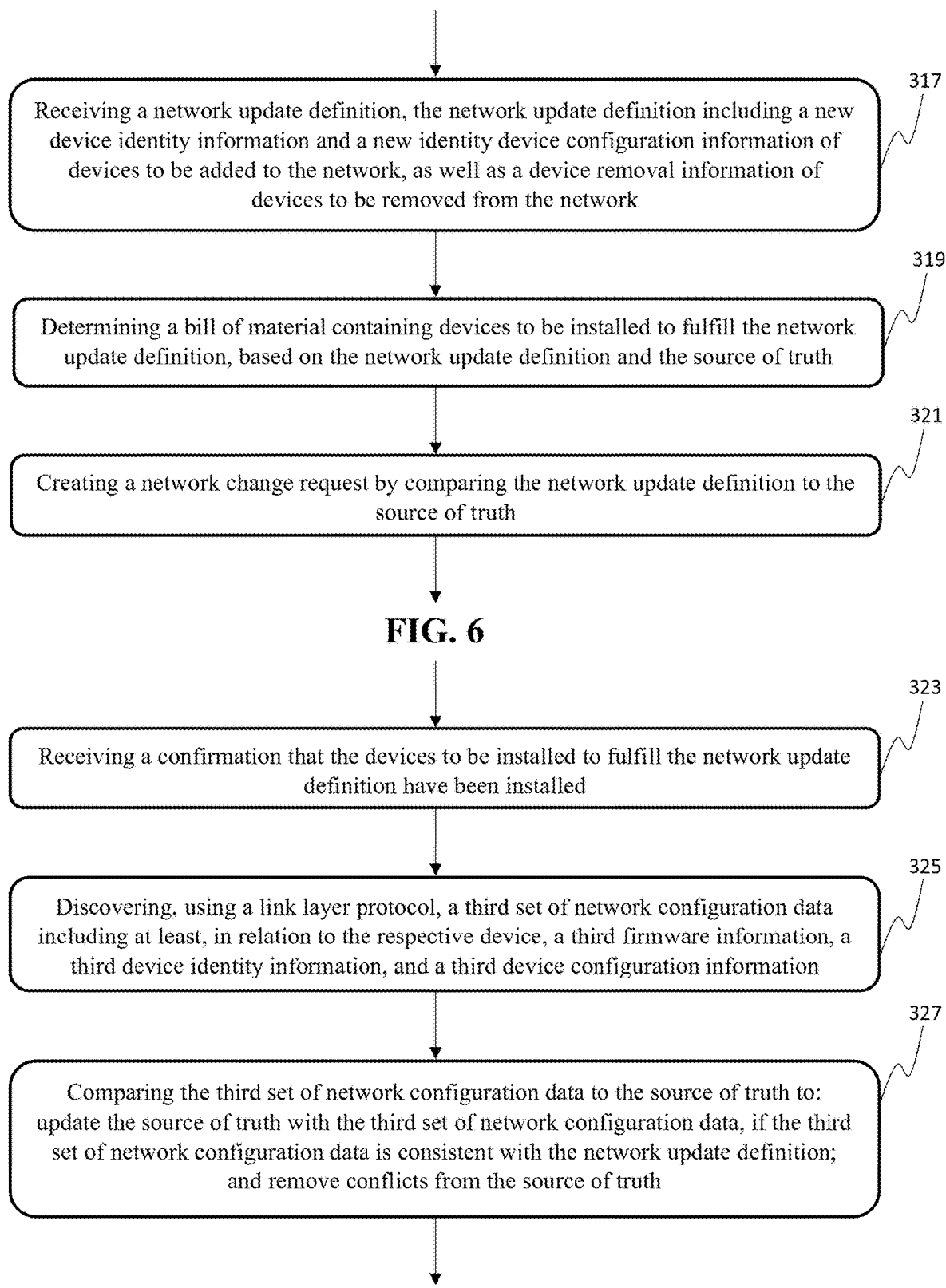
FIG. 6 is a further flowchart of the method of FIG. 3, showing receipt of a network update definition.
FIG. 7 is a further flowchart of the method of FIG. 3, showing the update of the source of truth based on receipt of a confirmation that the devices have been installed.

The method may be used for a variety of situations, for example as shown in FIG. 6, new devices 302 may be desired to be added to the network 120. To assist this process, at step 317, a network update definition 330 is created that includes a new device identity information and a new device configuration information relating to devices 302 to be added to the network 120. The network update definition 330 may also include a new device physical location information, relating to a location in which the device 302 is to be added, and a new device physical connectivity information, similar in nature to the physical connectivity information. The network update definition 330 may also, or instead, include a device removal information of devices 302 that are to be removed from the network 120. At step 319, a bill of materials 340 is determined, based on the network update definition 330 and the source of truth 310. As shown in FIG. 13, the bill of materials 340 extends beyond the devices 302 to be added, and also includes devices 302 that may be required to allow connection of the devices 302 to be added to the network 120, based on the present capabilities of the network 120, as evident from the source of truth 310. The bill of materials 340 may further include materiel that is required to physically connect the devices 302 to be added to the network 120, based on the physical location and physical connectivity truths and the network update definition 330.

Returning to FIG. 6, the method continues, at step 321, by creating a network configuration change request 350 by comparing the network update definition 330 to the source of truth 310. The network configuration change request 350 may then be processed as discussed above.

To monitor installation of the devices 302 to be added to the network 120, the method may, as shown in FIG. 7 include step 323 of receiving a confirmation that the devices 302 to be installed to fulfill the network update definition 330 have been installed. The method then continues at step 325 by discovering, using the link layer protocol, a third set of network configuration data that is substantially similar to the first set of network configuration data, but contains information relating to the devices 302 that have been installed. The third set of network configuration data is compared, at step 327, to the source of truth 310 to update the source of truth 310 with the third set of network configuration data, if the third set of network configuration data is consistent with the network update definition. The method also removes and/or flags conflicts of the third set of network configuration data from the source of truth 310, such that information relating to devices that have been removed from, or moved within, the network 120 is updated.

Figure 8:
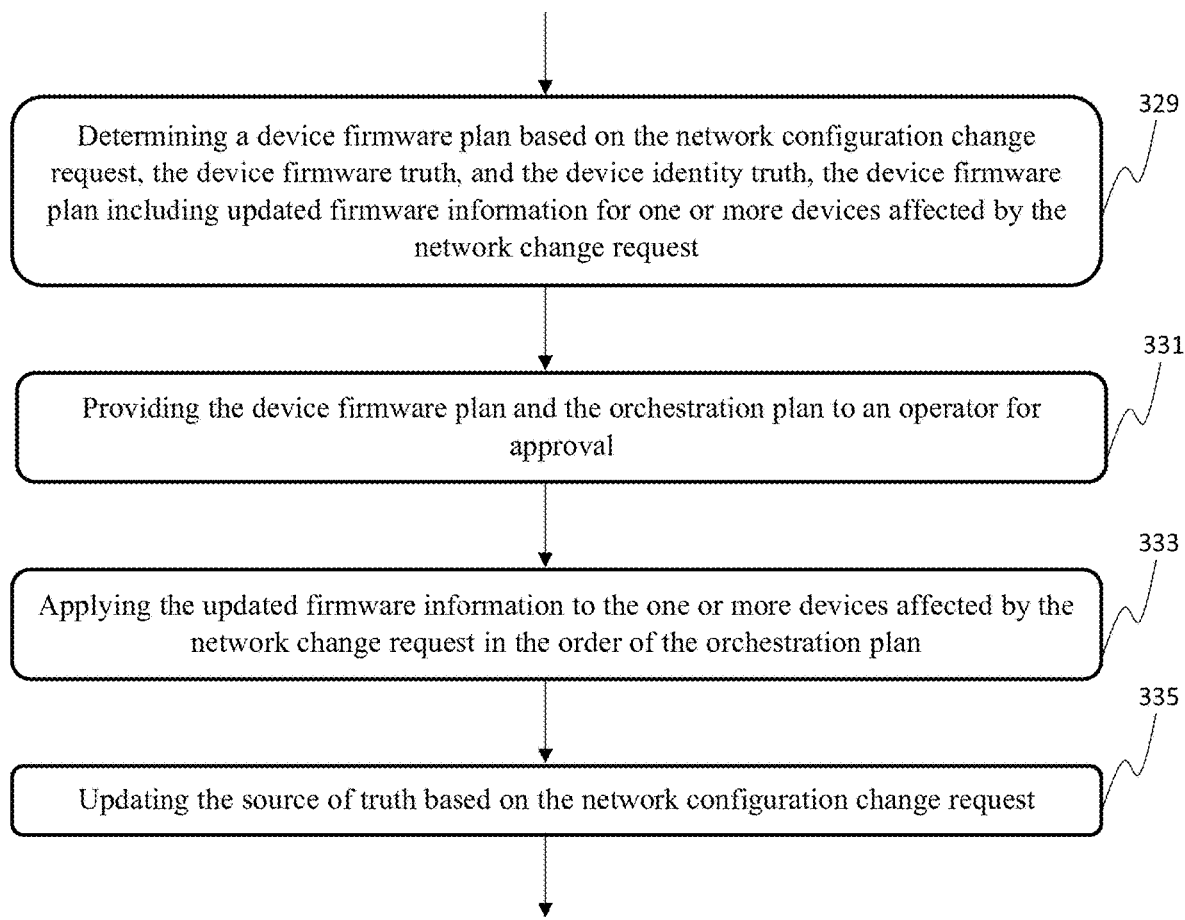
FIG. 8 is a further flowchart of the method of FIG. 3, showing the determination of a device firmware plan.

As the devices 302 on the network 120 may occasionally require updates of their firmware, the network configuration change request may relate to a change in firmware instead of, or in addition to, a change in device configuration. As shown in FIG. 8, the method may thus also include step 329 of determining a device firmware plan 380 based on the network configuration change request 350, the device identity truth, and the device firmware truth. The device firmware plan 380 includes updated firmware information for one or more device affected by the network configuration change request 350. The updated firmware information may include information relating to the new firmware version number and/or date, a flashable copy of the new firmware, and/or instructions to flash the new firmware onto the device 302 from a local or remote source. The method then continues with step 333 by applying the firmware plan, including the updated firmware information, to the one or more devices affected by the network configuration change request 350 in the order 372 of the orchestration plan 370. As before the source of truth is updated based on the network configuration change request, at step 335.

In an optional step 331, the device firmware plan 380 and the orchestration plan 370 are produced to an operator for approval of the plans 370, 380 before execution of the plans.

Figure 9:
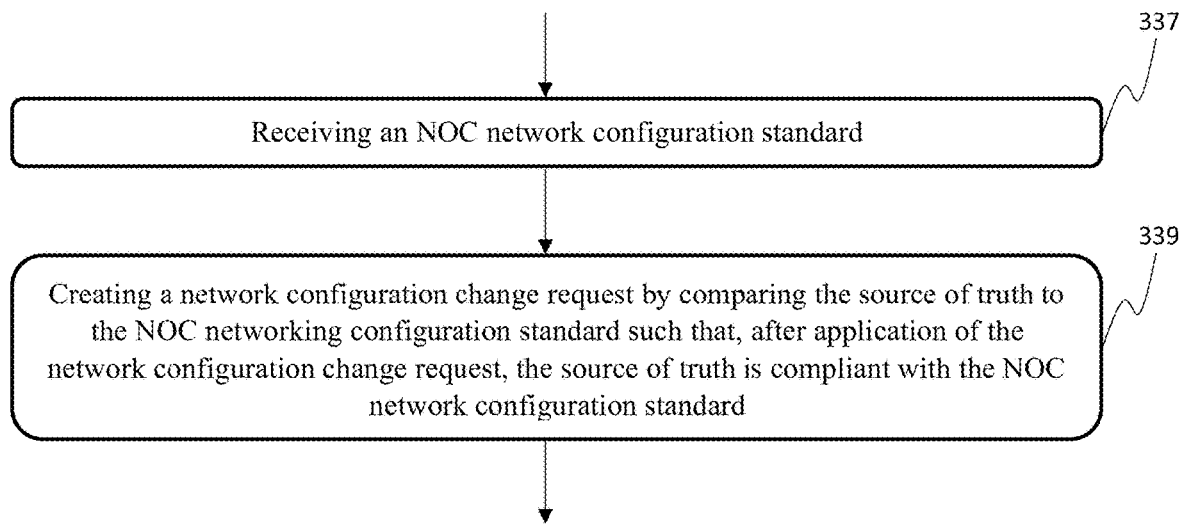
FIG. 9 is a further flowchart of the method of FIG. 3, showing receipt of a NOC network configuration standard.

In a preferred embodiment shown in FIG. 9, the method also includes step 337 of receiving an NOC network configuration standard 390. As shown in FIG. 16, the NOC network configuration standard 390 includes information relating to allowable firmware versions 369, allowed ciphers 371 that may be used on the network 120, and preferred network configuration settings 373. Preferably, the NOC network configuration standard 390 is formatted in terms of the generic, device-agnostic, configuration instruction language, so that the standard can be applied across the heterogenous devices 302 of the network 120. To implement the NOC standard 390, the method proceeds with step 339 of creating a network configuration change request by comparing the source of truth 310 to the NOC standard 390. The NOC standard 390 may be translated to device-specific configuration instruction language using the aforementioned library, to allow comparison against the source of truth 310.

The resulting network configuration change request includes a device configuration plan 360 and/or a device firmware plan 380 such that, after application of the network configuration change request as previously discussed, the source of truth 310 is compliant with the NOC network configuration standard 390.

Figure 10:
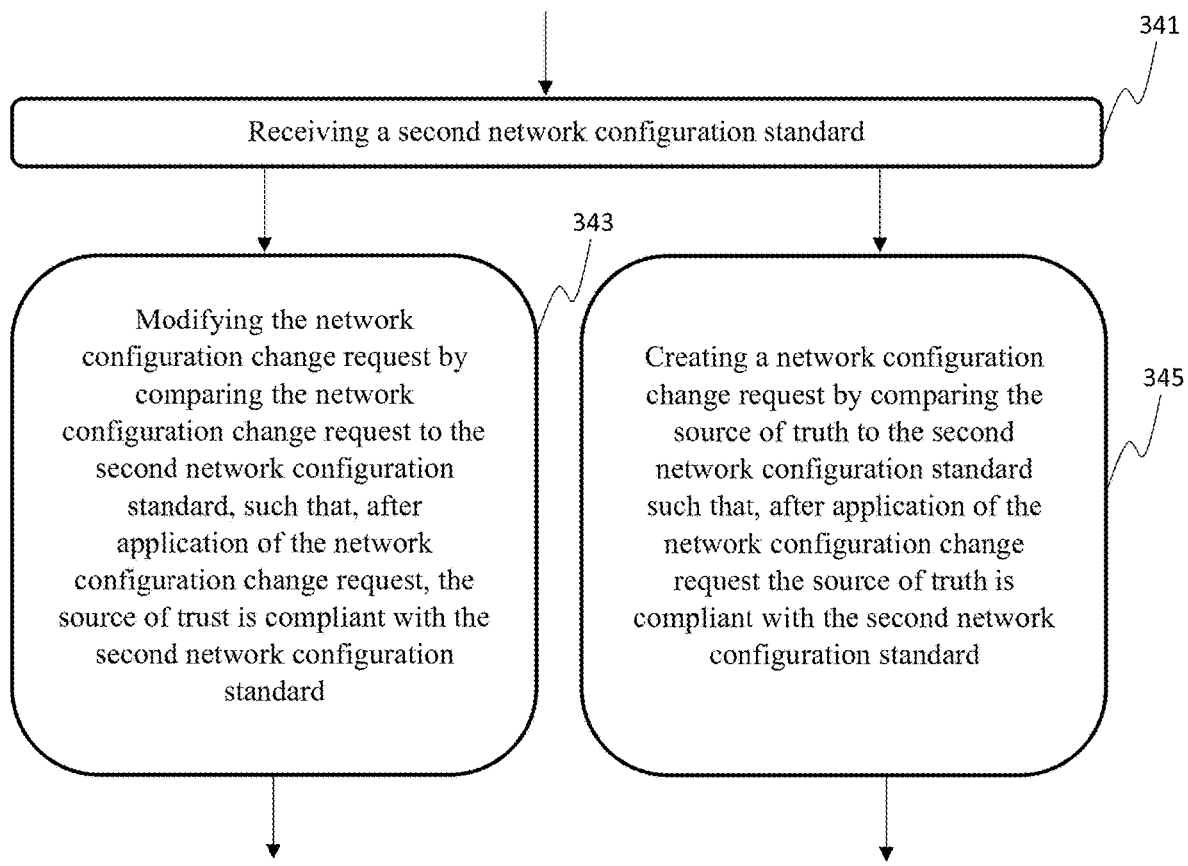
FIG. 10 is a further flowchart of the method of FIG. 3 showing receipt of a second network configuration standard.

In another preferred embodiment shown in FIG. 10, the method also includes step 341 of receiving a second network configuration standard. The second network configuration standard 400 includes similar information to the NOC network configuration standard 390. Typically the NOC network configuration standard is issued by device manufacturers, while the second network configuration standard may be a standard applied by an owner of the network 120, or be an obligation the owner of the network 120 has, such as a franchise agreement. A common industry term is "brand standard", as is commonly applied in, for example, hotels so that a user experience of the network 120 is substantially similar between different locations of the same brand. Preferably, the second network configuration standard 400 is formatted in terms of the generic, device-agnostic, configuration instruction language. To implement the second standard 400, the method may proceed with step 345 of creating a network configuration change request by comparing the source of truth 310 to the second standard 400. The second standard 400 may be translated to device-specific configuration instruction language using the aforementioned library, to allow comparison against the source of truth 310.

The resulting network configuration change request 350 includes a device configuration plan 360 and/or a device firmware plan 380 such that, after application of the network configuration change request 350, the source of truth 310 is compliant with the second network configuration standard 400.

The NOC and second standards 390, 400 may also be applied to a network configuration change request 350 that was created in a different portion of the present method. In this instance, the network configuration change request is, at step 343, compared to the NOC and second standards 390, 400 to alter, add, and/or delete portions of the device configuration plan 360 and/or the device firmware plan 380 such that, after application of the network configuration change request 350, the source of truth 310 is compliant with the standards 390, 400.

Figure 11:
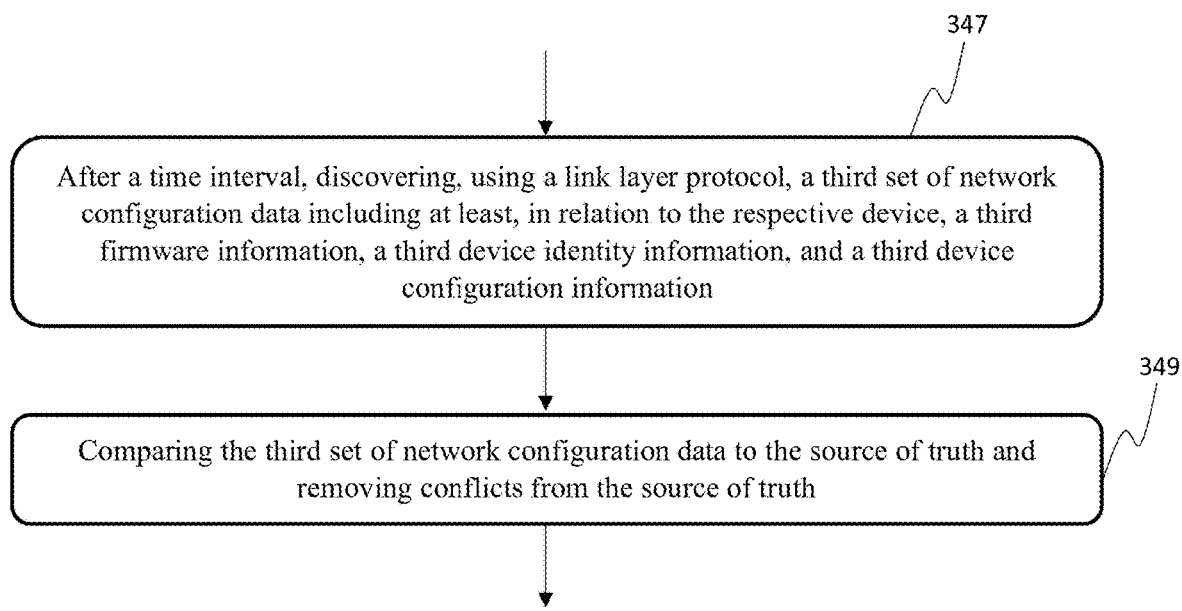
FIG. 11 is a further flowchart of the method of FIG. 3 showing discovery of a third set of network configuration data.

In another preferred embodiment shown in FIG. 11, periodically, after a time interval, for example after 24 h, 7 days, 1 month, 3 months, 6 months, or 1 year, the method includes step 347 of discovering, using the link layer protocol, the third set of network configuration data and, at step 349, comparing the third set of network configuration data to the source of truth 310. Conflicts between the third set of network configuration data and the source of truth 310 are flagged and/or removed from the source of truth 310.

Following processing of the network configuration change request, the source of truth 310 is updated based on the network configuration change request.

The invention claimed is:

1. A computer-implemented method for discovering a configuration of a network, the network having a plurality of heterogenous devices and a device hierarchy, the method including the steps of:
   discovering, using a link layer protocol and a set, a first set of network configuration data including at least, in relation to the respective device, a first firmware information, a first device identity information, and a first device configuration information,
   wherein the step of discovering the first set of network configuration data includes the sequential steps of:
   (a) identifying an identity of a home device by a behavior of the home device in response to SSH commands and/or a packet-layer specific behavior of the home device;
   (b) gathering information about the home device using a set of device-specific link layer protocol commands using a translation library that translates generic commands to the device-specific commands;
   (c) identifying a neighboring device of the home device by polling active network connections; and;
   (d) repeating steps (a)-(c) treating the neighboring device as the home device.

2. The method of claim 1, wherein the method further includes the steps of:
   creating, using the first set of network configuration data, a network configuration source of truth, the source of truth containing, in relation to each device, a firmware truth, a device identity truth, a device configuration truth, and a device hierarchy truth;
   receiving a second network configuration standard;
   creating a network configuration change request by comparing the source of truth to the second network configuration standard, such that, after application of the network configuration change request, the source of truth is compliant with the second network configuration standard.

3. The method of claim 1, used for changing a configuration of a network, wherein the method further includes the steps of:
   creating, using the first set of network configuration data, a network configuration source of truth, the source of truth containing, in relation to each device, a firmware truth, a device identity truth, a device configuration truth, and a device hierarchy truth;
   receiving a network configuration change request relating to one or more devices in the network;
   determining a device configuration plan based on the network configuration change request, the device configuration truth, and the device identity truth, the device configuration plan including an updated device configuration information for each device affected by the network configuration change request;
   determining an orchestration plan based on the network configuration change request, the device identity truth, and the device hierarchy truth, the orchestration plan including an order of devices affected by the network configuration change request; and
   applying the updated device configuration information to each device affected by the network configuration change request in the order of the orchestration plan.

4. The method of claim 3, further including the step of:
   receiving a second set of network configuration data, the second set of network configuration data including, in relation to the respective device, one or more of a physical location information, a physical connectivity information, a second firmware information, and a second device identity information,
   wherein the step of creating the network configuration source of truth includes comparing the first set of network configuration data to the second set of network configuration data and excluding conflicting data from the source of truth, and adding a physical location truth and a physical connectivity truth to the source of truth, based on the second set of network configuration data.

5. The method of claim 4, wherein the method further includes the step of:
creating, using the first set of network configuration data, a site survey plan for obtaining the second set of network configuration data, the site survey plan including device identity information and physical location information that is derivable from the first set of network configuration data.

6. The method of claim 4, wherein the method further includes the steps of:
receiving a network update definition, the network update definition including a new device identity information and a new identity device configuration information of devices to be added to the network, as well as a device removal information of devices to be removed from the network;
determining a bill of materials containing devices to be installed to fulfill the network update definition, based on the network update definition and the source of truth;
creating a network change request by comparing the network update definition to the source of truth.

7. The method of claim 6, wherein the method further includes the steps of:
receiving a confirmation that the devices to be installed to fulfill the network update definition have been installed;
discovering, using a link layer protocol, a third set of network configuration data including at least, in relation to the respective device, a third firmware information, a third device identity information, and a third device configuration information;
comparing the third set of network configuration data to the source of truth to:
update the source of truth with the third set of network configuration data, if the third set of network configuration data is consistent with the network update definition; and
remove conflicts from the source of truth.

8. The method of claim 3, wherein the method further includes the steps of:
determining a device firmware plan based on the network configuration change request, the device firmware truth, and the device identity truth, the device firmware plan including updated firmware information for one or more devices affected by the network change request; and
applying the updated firmware information to the one or more devices affected by the network change request in the order of the orchestration plan.

9. The method of claim 8, wherein the method further includes the step of:
providing the device firmware plan and the orchestration plan to an operator for approval.

10. The method of claim 3, wherein the method further includes the step of:
updating the source of truth based on the network configuration change request.

11. The method of claim 3, wherein the method further includes the steps of:
receiving a second network configuration standard;
creating a network configuration change request by comparing the source of truth to the second network configuration standard such that, after application of the network configuration change request, the source of truth is compliant with the second network configuration standard.

12. The method of claim 11, wherein the method further includes the steps of:
receiving a NOC network configuration standard;
before applying the network configuration change request, modifying the network configuration change request by comparing the network configuration change request to the NOC network configuration standard, such that, after application of the network configuration change request, the source of truth is compliant with the NOC network configuration standard.

13. The method of claim 3, wherein the method further includes the steps of:
receiving a NOC network configuration standard;
creating a NOC configuration change request by comparing the source of truth to the second network configuration standard such that, after application of the network configuration change request the source of truth is compliant with the NOC network configuration standard.

14. The method of claim 3, wherein the method further includes the step of:
after a time interval, discovering, using a link layer protocol, a third set of network configuration data including at least, in relation to the respective device, a third firmware information, a third device identity information, and a third device configuration information;
comparing the third set of network configuration data to the source of truth and removing conflicts from the source of truth.

15. The method of claim 3, the method further including the step of:
providing the device configuration plan and the orchestration plan to an operator for approval.

16. A non-transient computer-readable medium containing executable instructions for configuring a processor of a processing system to change a configuration of a network, wherein execution of the executable instructions by the processor configures the processor to perform the steps of the method of claim 1.

17. One or more servers performing the method of claim 1.

18. A system for managing the configuration of a network, the system including:
an electronic device; and
the one or more servers of claim 17.

* * * * *